United States Patent [19]

Kirby

[11] 4,235,254
[45] Nov. 25, 1980

[54] FLOW OPERATED VALVE

[76] Inventor: William D. Kirby, 2121 Hamilton Ct., Richland, Wash. 98255

[21] Appl. No.: 938,084

[22] Filed: Aug. 30, 1978

[51] Int. Cl.³ .......................................... F16K 31/163
[52] U.S. Cl. ............................... 137/119; 137/624.18
[58] Field of Search .................. 137/119, 624.18, 627; 251/230

[56] References Cited

U.S. PATENT DOCUMENTS

| | | | |
|---|---|---|---|
| 2,744,541 | 5/1956 | Fleischhauer | 137/627 |
| 2,781,050 | 2/1957 | Edwards | 137/119 |
| 3,524,470 | 8/1970 | Kah, Jr. et al. | 137/119 |
| 3,533,432 | 10/1970 | Kirby | 137/119 |
| 3,642,022 | 2/1972 | Kirby | 137/119 |
| 3,730,208 | 5/1973 | Lewis | 137/119 |
| 4,022,239 | 5/1977 | Schwindt et al. | 137/119 |
| 4,175,579 | 11/1979 | Richard | 137/119 |

Primary Examiner—William R. Cline
Attorney, Agent, or Firm—Wells, St. John & Roberts

[57] ABSTRACT

A flow operated valve having a single inlet and multiple outlets. Flow of liquid is directed through an enclosed body from the inlet to a single one of said outlets in a repetitive sequence, the selected outlet being rendered operative in response to initiation and cessation of liquid flow at the inlet. The flow of liquid through such outlet is controlled by a hinged valve, which in turn is operated by angularly spaced projections located along a pivot shaft. A slide within the body is reciprocated perpendicular to the shaft during initiation or cessation of flow at the inlet. This reciprocating movement is converted to incremental pivotal movement of the shaft, which in turn opens and closes the outlet valves in a repetitive sequence.

5 Claims, 8 Drawing Figures

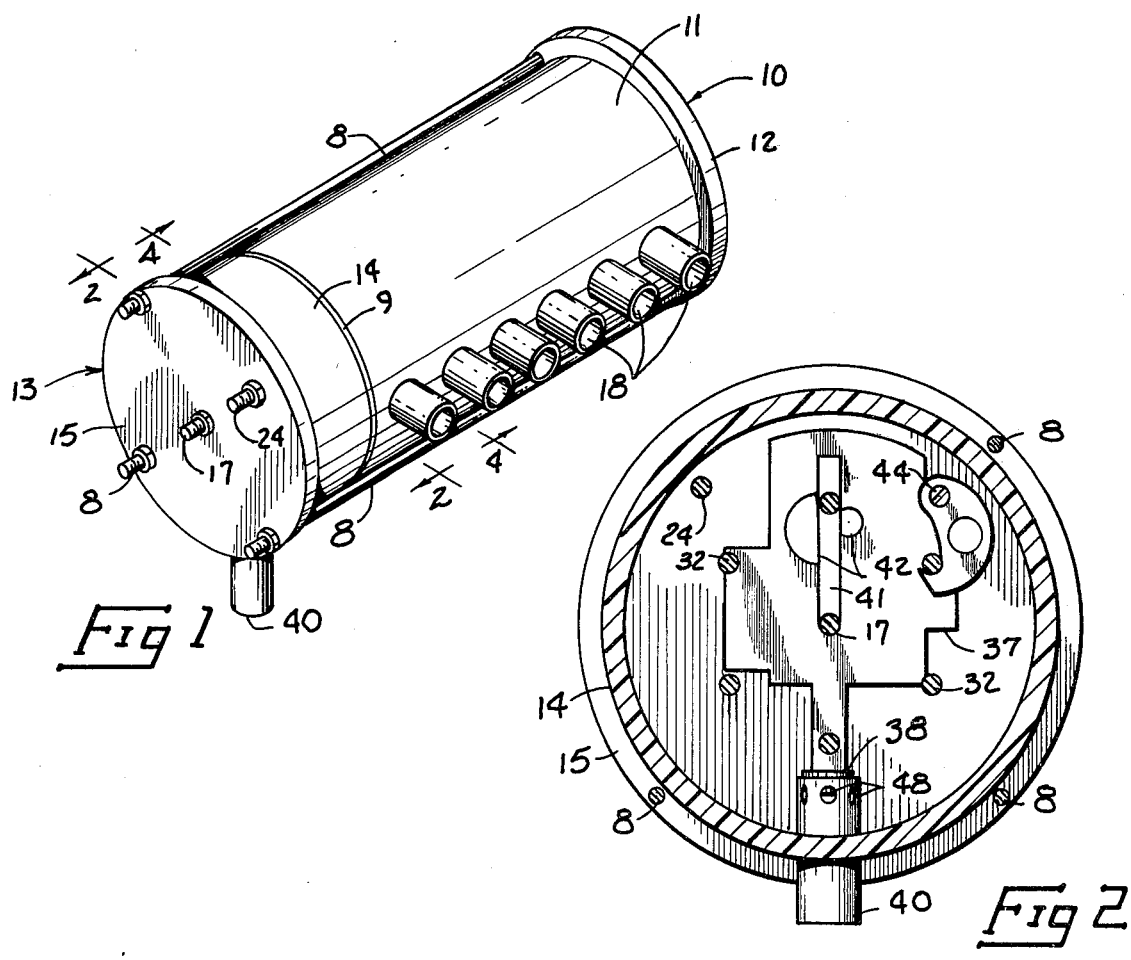
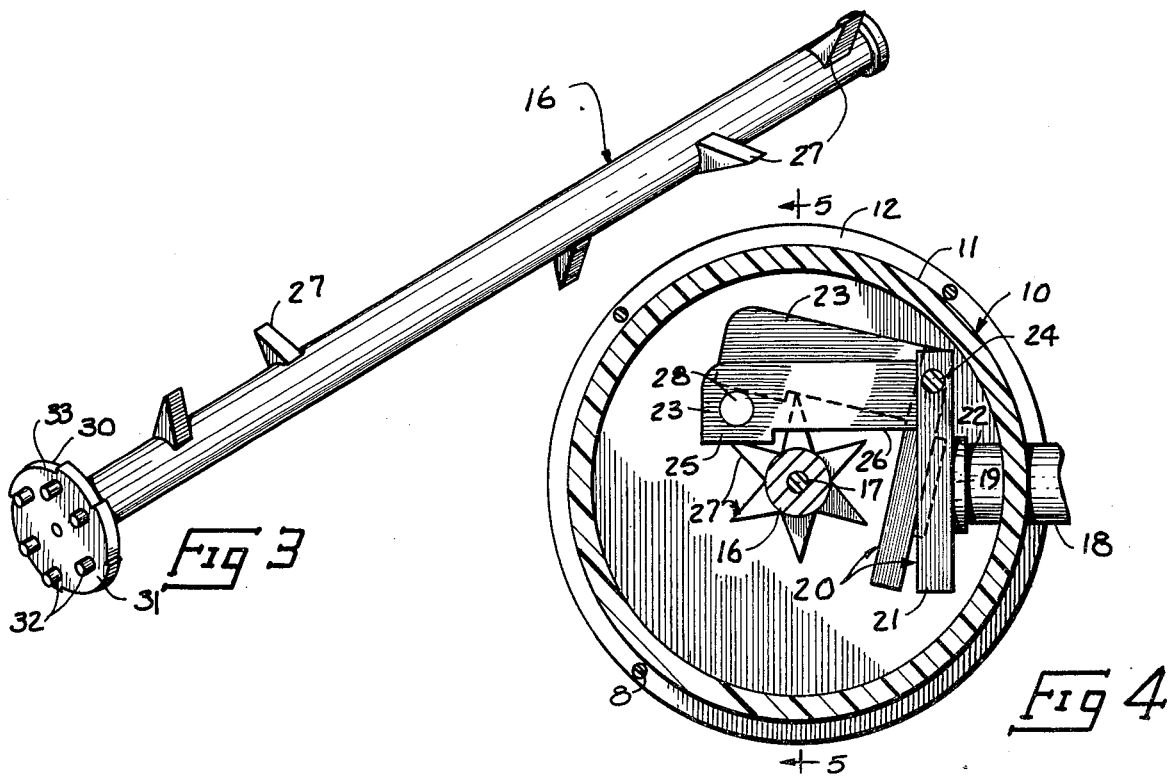

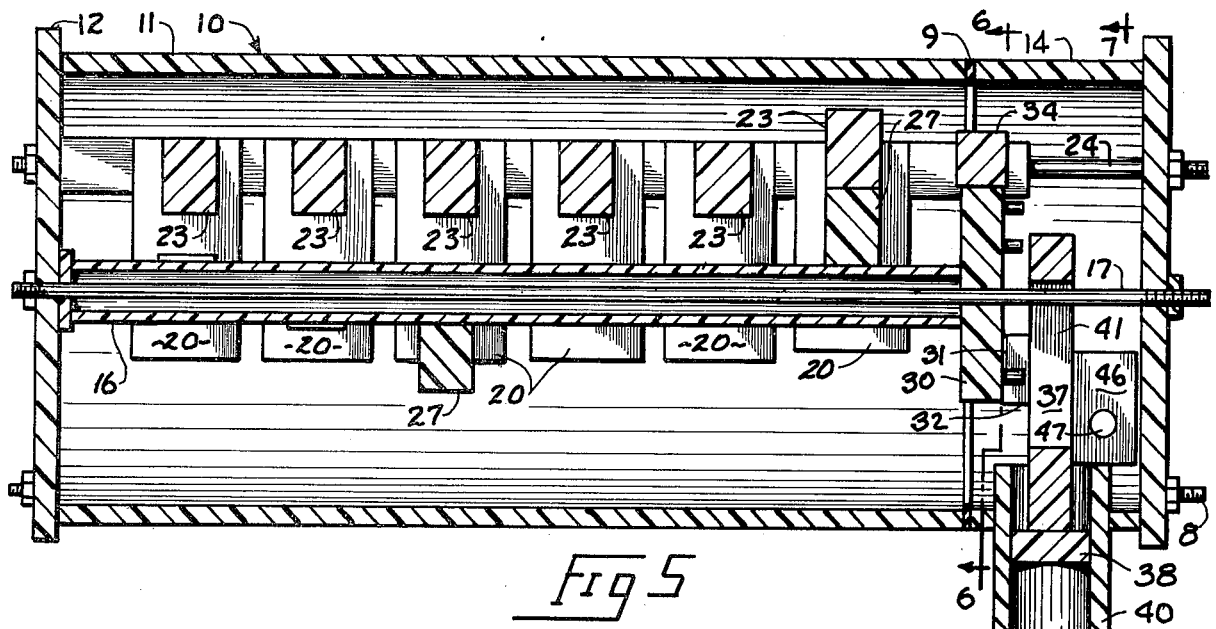
Fig 5
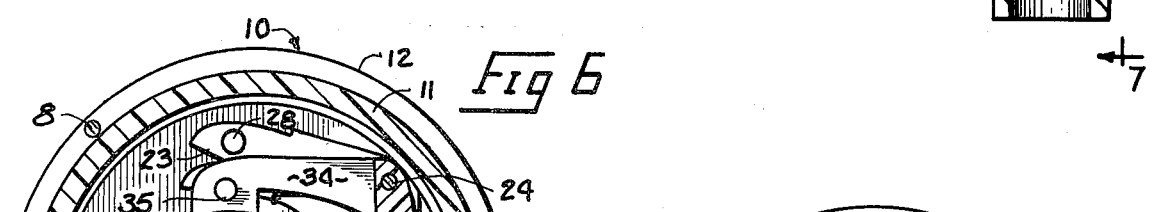
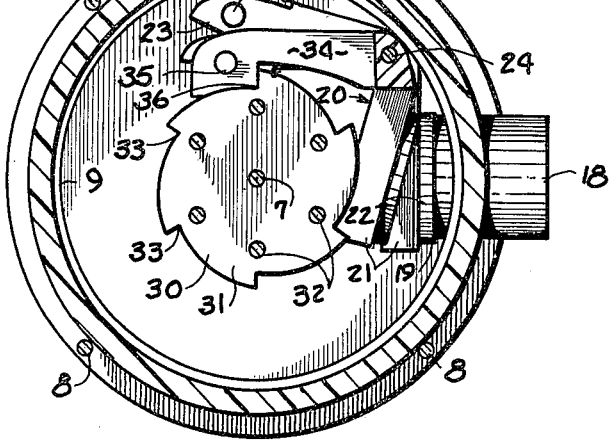
Fig 6
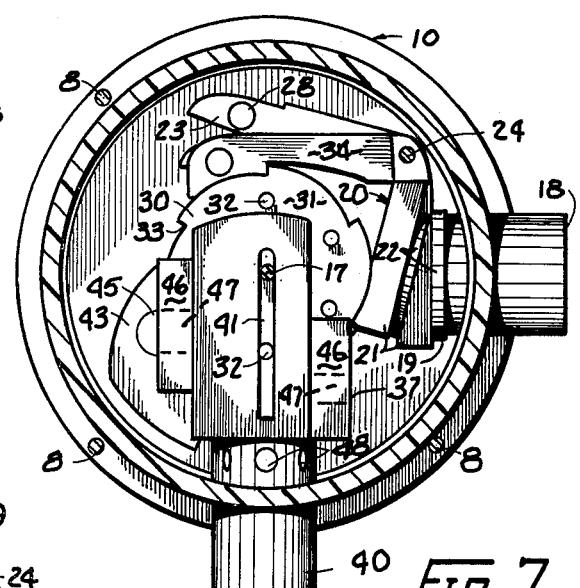
Fig 7
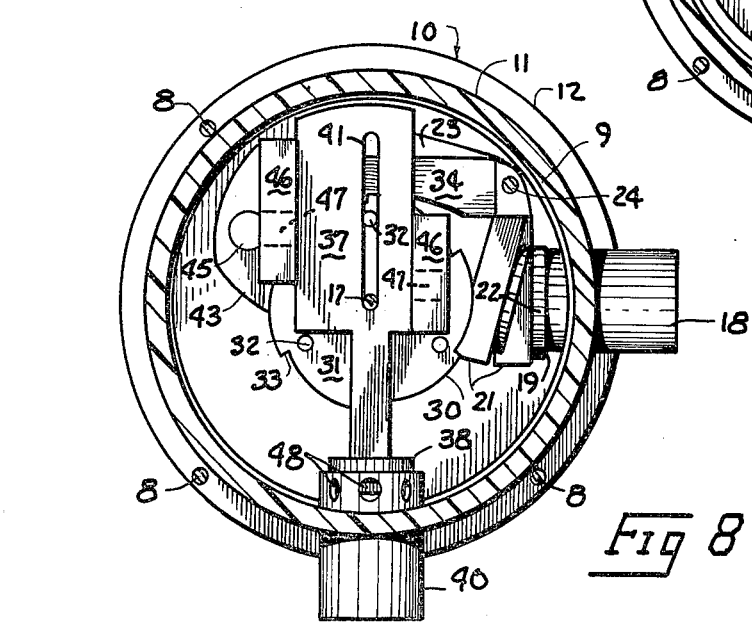
Fig 8

FLOW OPERATED VALVE

BACKGROUND OF THE INVENTION

This invention relates to the field of valves for liquids having multiple outlets and a single inlet, where the operation of the outlets is sequenced automatically upon cyclical operation of the inlet. In other words, by selectively initiating and ceasing flow of water at the inlet, one can direct the water or liquid through the series of outlets in a repetitive sequence.

The present valve apparatus was designed specifically for irrigation systems, although it might be applicable to other liquid delivery systems. Automatically operated sprinkler systems are available today for irrigation purposes. Most such systems use clock controlled valves to direct liquid flow to various portions of the system. Such systems are complex and expensive and normally involve the use of substantial electrical apparatus, with a resulting hazard from electrical shock in a grounded system.

According to this disclosure, the multi-outlet valve is sequenced hydraulically in response to initiation of liquid flow at the inlet. The outlets in this valve structure are in-line and can be sequenced in any desired repetitive pattern. Thus, a single automatic or clock-controlled valve controlling flow to the inlet of this valve can be used to time the sprinkling cycle controlled by each of the multiple outlets. In other installations, the flow to the inlet of the valve might be controlled manually, which will result in the sequencing of the outlet valves with no automatic controls exterior to the valve itself.

DESCRIPTION OF THE DRAWINGS

FIG. 1 is an external perspective view of a valve;

FIG. 2 is a transverse sectional view taken along line 2—2 in FIG. 1;

FIG. 3 in an enlarged perspective view of the rotatable shaft assembly within the valve;

FIG. 4 is an enlarged cross-sectional view taken along line 4—4 in FIG. 1;

FIG. 5 is a longitudinal sectional view through the entire assembly as seen generally along line 5—5 in FIG. 4;

FIG. 6 is a transverse sectional view taken along line 6—6 in FIG. 5;

FIG. 7 is a transverse sectional view taken along line 7—7 in FIG. 5;

FIG. 8 is a view similar to FIG. 7, showing the operative position of the slide during liquid flow at the inlet.

DESCRIPTION OF THE PREFERRED EMBODIMENT

Referring now to the drawings, the present valve is located within an enclosed hollow body generally designated by the numeral 10. The valve body includes a hollow cylindrical shell 11 capped at one end by a fixed end wall 12. Its opposite end is capped by a removable cover 13 including a short length of cylindrical wall 14 matching the interior and exterior diameters of the cylindrical shell 11. The cover 13 is completed by a circular end wall 15 that encloses one end of the cylindrical wall 14. A suitable gasket 9 is located between the adjacent ends of shell 11 and wall 14 to assure a watertight connection between them when the valve body 10 is fully assembled (FIGS. 1 and 5).

A support rod 17 is engaged through the centers of end wall 12 and end wall 15, and is held in place by threadable engagement of nuts bearing on the outer surfaces of these walls. Located within valve body 10 is a shaft 16, which is tubular and rotatably journalled about the central longitudinal support rod 17. Besides providing rotatable support for shaft 16, the rod 17 also serves to maintain the elements of valve body 10 in axial compression. The valve body 10 is also held together by peripheral longitudinal rods 8, also threaded and engaged by conventional nuts that bear against the outer surfaces of the end walls 12 and 15.

The cylindrical sheel 11 of the valve body has a plurality of liquid outlets in open communication with the interior of the valve body. These outlets 18 have inner ends 19 arranged along a line that is parallel to the longitudinal axis of shaft 16 and support rod 17. The inner end 19 of each outlet 18 is associated with a valve generally designated by the numeral 20. The number of valves 20 is equal to the number of outlets 18. In the specific example shown, there are six outlets 18 and six associated valves 20.

Each valve 20 includes a rigid flap 21 that mounts a circular resilient disk or pad 22. Each pad 22 selectively overlaps the inner end of the associated outlet 18 in order to seal that outlet from communication with the interior of body 10. The valve 20 also includes a rigid integral arm 23 that is fixed to the flap 21 and which moves in unison with it. The valves 20 are pivoted with respect to body 10 by a hinged rod 24 that extends between the end walls 12, 15 of the valve body. The axis of the valves 20 about the hinged rod 24 is parallel to the axis of shaft 16.

The shaft 16 carries a plurality of radial valve operators in the form of radial projections 27 fixed to shaft 16 for movement in unison with it. Each valve operator or projection is located within the valve body 10 in operative engagement with one of the arms 23 of a valve 20. The radial projections 27 selectively engage the lower surface 25 of the associated arm 23. As shown, the outer end of this lower surface 25 is stepped at 26 to assist in preventing reverse rotation of the shaft 16. The arms 23 are biased toward shaft 16 by outer weights 28 of lead or suitable heavy material. It is to be noted that the flap 21 of each valve 20 overlaps the inner end 19 of a single outlet 18 and that the rigid arm 23 fixed to the flap 21 extends inwardly through the interior of the valve body 10 beyond the shaft 16. In the gravity model illustrated, the outlets 18 are in a horizontal position, with the arms 23 extending above the shaft 16.

Also fixed to the shaft 16 is a plate 30 that is arranged perpendicular to the axis of shaft 16. Plate 30 is fixed to shaft 16 and pivots in unison with it. Its outer surface 31 is planar and perpendicular to the shaft axis. A series of longitudinal pins 32 project outwardly from the surface 31 opposite to the projections 27. The number of pins 32 is equal to the number of valves 20 and the number of radial projections 27. Again, in this example, there are six. The periphery of plate 30 is provided with six indentations 33 which are adapted to be engaged by a freely pivoted arm 34 mounted to the hinge rod 24 described above. The arm 34 is weighted at 35 so as to bear against the periphery of plate 30 at all times. It has a downwardly facing step 36 which cooperates with the indentations 33 to prevent reverse rotation or pivotal movement of the plate 30 and shaft 16 during operation of the apparatus.

The radial projections 27 on shaft 16 are longitudinally spaced from one another to correspond to the longitudinal spacing between the valves 20. They are also angularly spaced with respect to one another about the axis of shaft 16. This angular spacing between adjacent projections 27 is constant along the length of shaft 16. The illustrated projections 27 are therefore in a spiral pattern along the length of shaft 16. However, the spiral arrangement is not essential if a different sequential operation of the outlets 18 is desired. The projections 27 must be spaced apart by equal angular amounts but the location of successively operative projections 27 might be staggered along the length of shaft 16.

The longitudinal pins 32 are also equiangularly spaced with respect to the axis of shaft 16. The same is true of the rim indentations 33. In the illustrated example, since there are six outlets, the projections 27, pins 32 and indentations 33 are each angularly spaced by sixty degree increments.

Shaft 16 is pivoted about its axis by operation of a reciprocal slide 37 located within the removable cover 13 of the valve body 10. Slide 37 includes an integral plunger 38 received within a cylindrical liquid inlet 40. The inlet 40 is adapted to be connected to an interruptable source of liquid, such as irrigation water. The inner end of inlet 40 has a series of openings 48 formed radially about it in open communication with the interior of the body 10. The plunger 38 is movable from its lower vertical position (FIG. 7) to an elevated vertical position (FIG. 8) in response to initiation of flow of liquid through the inlet 40. After the flow of liquid has raised the slide 37 by impinging upon the lower end of plunger 38, the liquid is free to flow through the valve body 10 through the openings 48.

Slide 37 is guided for vertical movement within the valve body 10 by means of a vertical slot 41 which receives the stationary longitudinal support rod 17 previously described. Slid 37 is axially guided by bearing blocks 42 which rub against the end surface 31 of plate 30, and by oppositely facing spacer blocks 46, which rub against the inner vertical surface of end wall 15.

Slide 37 has a freely pivotable pawl 43 suspended downwardly adjacent to the plate 30. Pawl 43 includes an open hook which is adapted to engage beneath one of the pins 32 on the plate 30. The pawl 43 is weighted to an inwardly biased position by weight 45, which is integral with the pawl 43. The pawl 43 is adapted to engage its open hook beneath each pin 32 and then to lift the pin 32 as the slide 37 is raised by water flow in the inlet 40. When slide 37 reaches the limit of its upper movement, it will engage the interior of the cylindrical wall 14. One of the pins 32 will also come into engagement with one of the bearing blocks 42, again assuring proper angular positioning of shaft 16 about the axis provided at support rod 17. Should there be a momentary interruption of water flow, or a decrease in flow that might cause the slide 37 to slightly turn the plate 30 in the reverse direction, such mmovement will be prevented by the interengagement of pivoted arm 34 and the rim indentations 33 on the plate 30.

In this preferred form, the inlet 40 is in a vertical position, with the flow of water being directed upwardly into the valve body 10. The slide 37 is provided with weights 47 in the spacer blocks 46 to assure gravitational movement of the slide 37 downwardly within the inlet 40 when flow of liquid through inlet 40 has ceased.

The operation of the valve is controlled automatically by initiating and ceasing flow of liquid to the inlet 40. This can be accomplished by manual operation of a valve (not shown) interposed between the source of liquid and inlet 40, or by use of a repetitious time-controlled valve designed to start and stop the flow of liquid on a cyclical basis.

When not activated by a flow of liquid, slide 37 is in its lower position shown in FIG. 7. Then when liquid is directed through inlet 40, slide 37 is raised to its uppermost position (FIG. 8), which causes the pawl 43 to lift the pin 32 engaged by it during its downward travel. The angular relationship of the pins 32 is such that shaft 16 will be pivoted 60 degrees each time that slide 37 is receiprocated through its full path of travel. As the shaft 16 is pivoted, one of the angularly spaced projections 27 will lift an engaged arm 23 to open a valve 20, while another will disengage an arm 23 to close the valve 20 that was previously operative. The relationship between the projections 27 and arms 23 is such that two valves 20 will be open momentarily during this transition. This prevents any buildup of pressure within the valve body 10 which might otherwise hinder proper operation and subsequent opening of a valve 20.

When a liquid cycle or sprinkling period has been completed, flow of liquid to the inlet 40 is stopped, allowing slide 37 to drop vertically by gravity. As it moves downwardly, reverse pivotal movement of shaft 16 is prevented by the engagement of the indentations 33 by the step 36 on arm 34 and by the ability of pawl 43 to pivot freely about the pivot screw 44. When slide 37 reaches its lowermost position, the pawl 43 will be engaged beneath the next pin 32 and will be ready for subsequent operation.

Various modifications can be made in the structure without deviating from the basic concept. For instance, springs or other biasing devices might be used to bias the valves 20, slide 37 and pawl 43, thereby eliminating reliance on gravity and allowing the valve assembly to be used in various spatial orientations.

For these reasons, only the following claims are set out as definitions of the invention disclosed herein.

Having described my invention, I claim:

1. A flow-operated valve, comprising:
   an enclosed hollow body;
   a shaft rotatably mounted within said body about a longitudinal axis;
   a liquid inlet in open communication with the interior of said body;
   a plurality of liquid outlets each in open communication with the interior of said body, said outlets having inner ends within said body arranged along a line that is parallel to said longitudinal axis;
   a plurality of valves equal in number to the number of said outlets, each of the valves being located within said body and being individually hinged to the interior of said body about a common pivot axis parallel to said longitudinal axis for movement between first positions wherein an individual valve overlaps and seals the inner end of one of said outlets and second positions wherein it is clear thereof;
   means within said body operably connected between said liquid inlet and said shaft for incrementally pivoting said shaft relative to said body about said longitudinal axis in a progressive sequence in response to initiation and cessation of flow at said liquid inlet;

and individual valve operator means on said shaft within said body and operably engageable with corresponding individual valves for sequentially moving the valves between their first and second positions in response to incremental pivotal movement of said shaft about said longitudinal axis.

2. The apparatus as set out in claim 1, wherein said valve operator means comprises:

a series of radial projections fixed to said shaft and longitudinally spaced along said longitudinal axis, said projections being angularly spaced from one another by common angular increments about said longitudinal axis;

said valves each comprising:

a rigid flap adapted to overlap the inner end of one outlet;

and a rigid arm fixed to the flap and extending angularly therefrom inwardly within said body, said arm overlying the shaft at the longitudinal location of one of said radial projections;

whereby the valve is selectively moved from its first position to its second position by engagement of its arm by the radial projection which it overlies.

3. A flow operated valve, comprising:

an enclosed hollow body;

a shaft rotatably mounted within said body about a longitudinal axis;

a liquid inlet in open communication with the interior of said body;

a plurality of liquid outlets in open communication with the interior of said body, said outlets having inner ends within said body arranged along a line that is parallel to said longitudinal axis;

a plurality of valves equal in number to the number of said outlets, each of the valves being located within said body and being individually hinged to the interior of said body about a common pivot axis parallel to said longitudinal axis for movement between first positions wherein an individual valve overlaps and seals the inner end of one of said outlets and second positions wherein it is clear thereof;

a plurality of radial valve operators fixed to said shaft and longitudinally spaced along the length of said shaft within the body in operative engagement with the respective valves, said valve operators being angularly spaced from one another by common angular increments about said longitudinal axis for individually moving the valves between their first and second positions in response to pivotal movement of said shaft about said longitudinal axis;

and sequencing means within said body operably connected between said inlet and said shaft, said sequencing means being responsive to initiation and cessation of liquid flow at said inlet for pivoting said shaft relative to said body about said longitudinal axis by one of said common angular increments.

4. An apparatus as set out in claim 3 wherein each of said valves comprises:

a rigid flap adapted to overlap the inner end of one outlet;

and a rigid arm fixed to the flap and extending therefrom inwardly within said body, said arm overlying the shaft at the longitudinal location of one of said radial valve operators;

whereby the valve is selectively moved from its first position to its second position by engagement of its arm by the radial valve operator which it overlies.

5. An apparatus as set out in claim 3 wherein said sequencing means comprises:

a plate fixed to said shaft and having one side thereof perpendicular to said longitudinal axis;

a plurality of longitudinal pins equal in number to the number of said outlets, said pins projecting from said one side of said plate at angular locations equally spaced about said longitudinal axis;

slide means mounted within said body for reciprocating motion parallel to said one side of the plate in response to initiation or cessation of liquid flow at said inlet;

and pawl means on said slide means selectively engageable with said pins for converting the reciprocating motion of the slide member to unidirectional incremental pivotal motion of said shaft about said longitudinal axis.

* * * * *